United States Patent
Esser et al.

(10) Patent No.: US 8,235,393 B2
(45) Date of Patent: Aug. 7, 2012

(54) PISTON RING

(75) Inventors: Johannes Esser, Odenthal (DE);
Hans-Rainer Brillert, Burscheid (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 355 days.

(21) Appl. No.: 12/527,152

(22) PCT Filed: Jan. 24, 2008

(86) PCT No.: PCT/DE2008/000130
§ 371 (c)(1),
(2), (4) Date: Aug. 13, 2009

(87) PCT Pub. No.: WO2008/098544
PCT Pub. Date: Aug. 21, 2008

(65) Prior Publication Data
US 2010/0019457 A1    Jan. 28, 2010

(30) Foreign Application Priority Data

Feb. 17, 2007  (DE) .......................... 10 2007 007 965

(51) Int. Cl.
*F16J 9/26*    (2006.01)

(52) U.S. Cl. ......... 277/440; 277/442; 277/443; 277/444

(58) Field of Classification Search .......... 277/440–444, 277/460
See application file for complete search history.

(56) References Cited

U.S. PATENT DOCUMENTS

| | | | | |
|---|---|---|---|---|
| 3,573,874 A | * | 4/1971 | Hill et al. | 277/444 |
| 3,814,447 A | * | 6/1974 | Prasse et al. | 428/663 |
| 4,040,637 A | * | 8/1977 | McCormick | 277/460 |
| 4,077,637 A | * | 3/1978 | Hyde et al. | 277/444 |
| 4,106,782 A | | 8/1978 | Hyde et al. | |
| 4,185,843 A | * | 1/1980 | Beyer et al. | 277/441 |
| 4,251,599 A | * | 2/1981 | McCormick | 428/682 |
| 4,307,890 A | * | 12/1981 | Cromwell et al. | 277/441 |
| 4,323,257 A | * | 4/1982 | Kondo et al. | 277/441 |
| 5,794,943 A | * | 8/1998 | Atmur et al. | 277/441 |
| 7,267,344 B2 | * | 9/2007 | Fischer et al. | 277/443 |
| 7,871,078 B2 | * | 1/2011 | Fischer et al. | 277/442 |
| 2004/0258547 A1 | * | 12/2004 | Burger et al. | 417/471 |
| 2005/0218603 A1 | * | 10/2005 | Fischer | 277/443 |
| 2009/0174150 A1 | * | 7/2009 | Smith et al. | 277/442 |
| 2010/0044967 A1 | * | 2/2010 | Esser et al. | 277/442 |

FOREIGN PATENT DOCUMENTS

DE    10359802 B3    3/2005
EP    1132663 A      9/2001

* cited by examiner

*Primary Examiner* — Alison Pickard
(74) *Attorney, Agent, or Firm* — Robert L. Stearns; Dickinson Wright, PLLC

(57) ABSTRACT

A piston ring having a base body, which comprises a running surface provided with at least one chamber, an upper and a lower flank surface, and an inner circumferential surface, wherein the running surface is provided with at least one PVD layer such that the same is adjusted to the contour of the running surface without completely filling the chamber, wherein the respective edge region is provided with a layer thickness, b that is reduced compared to the layer thickness, a of the chamber as a function of the configuration of the chamber.

4 Claims, 1 Drawing Sheet

PISTON RING

BACKGROUND OF THE INVENTION

1. Technical Field

Figure 3:
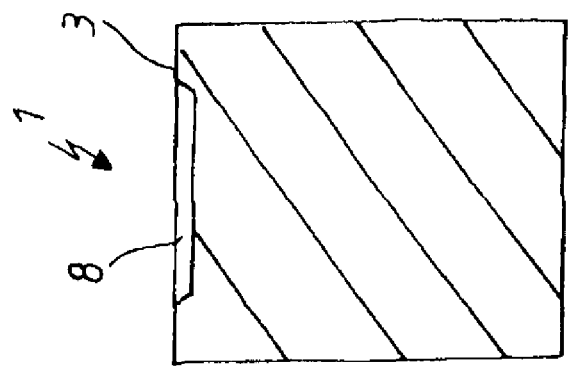

The invention concerns a piston ring, having a main body, which exhibits a contact surface provided with at least one chamber configuration, one upper and one lower flank surface along with one inner peripheral surface.

2. Related Art

A piston ring as well as a process for producing the same may be gleaned from DE 103 59 802 B3. The piston ring contains a contact surface provided with a contact surface profile along with one upper and one lower flank surface, wherein at least the contact surface is provided with a vapor deposit coating, in such a way that a portion of the contact surface is provided with a removable mask, so that after production of the vapor deposit coating and removal of the mask a substantially sharp-edged contact edge is provided between the contact surface and at least one of the flank surfaces.

In order to achieve good oil consumption and break-out behavior it is necessary for the lower edge at the transition from the ring contact surface to the ring flank to be designed so that the edges are as sharp as possible. In the case of coated piston rings these requirements prove to be increasingly difficult, dependent upon the coating thickness of the contact surface layer.

Well known solutions for this problem are rings which are single-sided and full of chambers, in which the coating is only deposited in the central to upper, or only in the central area of the contact surface. The critical edge is formed by the base material and due to this proves to be completely sharp-edged.

SUMMARY OF THE INVENTION

The task underlying the invention is to develop the state of the art further, to the effect that while retaining a lower edge on the piston ring with the sharpest edge possible a contact surface coating of reduced coating thickness may be applied, in order to guarantee an increased break-out safety in this area.

This task is solved by a piston ring having a main body, which exhibits a contact surface provided with at least one chamber configuration, an upper and a lower flanking surface along with a contact surface provided with a chamber configuration, whereby the contact surface is provided with at least one PVD coating, in such a way that the same is matched to the chamber contour, without completely filling the chamber, whereby depending upon the construction of the chamber configuration each edge area is provided with a coating thickness which is reduced with respect to the coating thickness of the chamber configuration.

In the case of the PVD (Physical Vapor Deposition) coating it concerns a process wherein the coating of the contact surface of the piston ring results from precipitation from the vapor phase. The coating material to be precipitated exists in the process as ionized particle flow.

According to the invention a special design of chambered piston rings is proposed, in which the chamber is not completely filled up with the conventional wear-resistant materials, but exclusively a PVD coating, for example on the basis of nitrides, e.g. CrN and/or CrON, is applied to the contact surface (including chambers).

On account of the high wear resistance of this PVD coating it is possible to fill the chamber only to a height of about 10 to 50 µm. The initially uniform, i.e. having the same coating thickness, PVD coating applied to the whole contact surface, is then worn away to a defined amount outside the chamber configuration, for example to a remaining coating thickness of 1 to 10 µm. Due to these measures the chambered area of the contact surface is then set back radially slightly. For this reason the PVD coating of the chamber configuration will not come into contact with the cylinder wall over a certain running-in period and the clearance will form a reservoir for lubricating oil.

Of particular advantage is when the PVD coating is formed from the group IV b to VI b elements in the periodic table based upon nitrides. This may optionally be done with the addition of the following elements, singly or in combination: Al, Si, C, O.

On account of the narrow protruding i.e. bearing areas at the edges of the contact area the piston ring will interact with the cylinder wall for a certain running-in time with distinctly raised surface pressure, so that the oil consumption may be lowered in this phase.

Only after finishing the running-in phase and completely stripping of the coating on the initially protruding edge areas along with the optimal shape adaptation of the contact surface to the cylinder wall will the chambered area provided with the PVD coating come to rest upon the cylinder wall.

THE DRAWINGS

Figure 2:
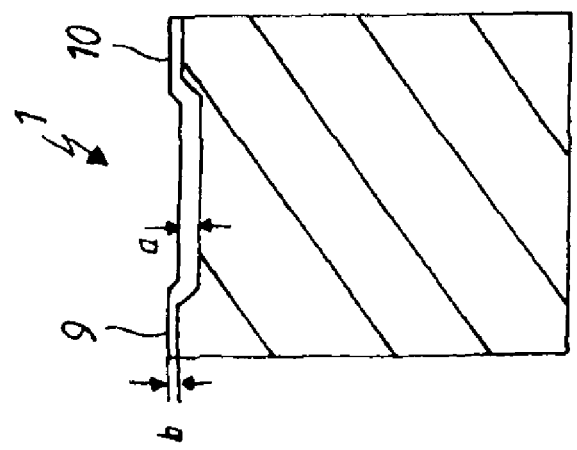
Figure 1:
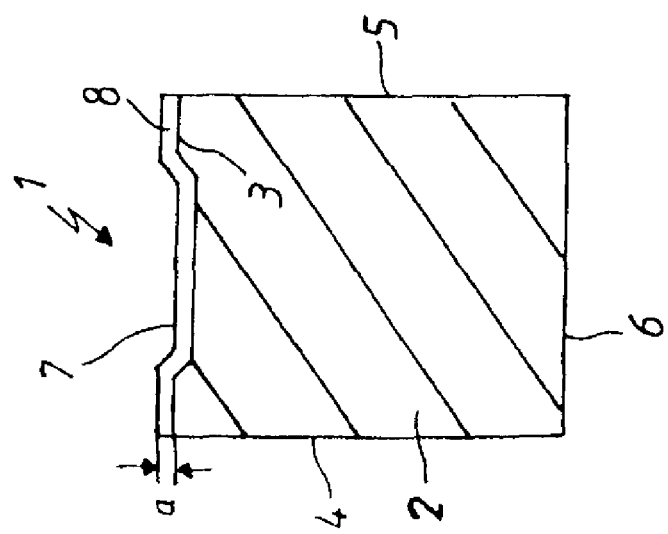

The object of invention is described as follows with the aid of an embodiment example shown in the drawings: It shows:

FIG. 1 Chambered piston ring with a contact surface coating;

FIG. 2 Piston ring according to FIG. 1 after having been machined

FIG. 3 Piston ring according to FIG. 1 after its running-in behavior

DETAILED DESCRIPTION

FIG. 1 shows a piston ring 1 in cross-section, having a main body 2, which exhibits a contact surface 3, an upper 4 and a lower flank surface 5 along with an inner peripheral surface 6. In the area of the contact surface 3 a chamber configuration 7 is incorporated. The contact surface 3 including chamber configuration 7 is provided with a PVD coating 8, in this example on the basis of CrN. On account of the precipitation properties of PVD coatings the covering coat 8 reproduces exactly the contour of contact surface 3 and chamber configuration 7 lying underneath. It can be recognized that the chamber configuration 7 is only partially filled with the PVD coating 8. The coating thickness 'a' of the PVD covering coat 8 is consequently the same both on the edge areas 8, 9 and also within the chamber configuration 7. In this example they have a thickness of 40 µm.

FIG. 2 shows the piston ring 1 according to FIG. 1 after having been machined. The coating thickness 'a' recognized in FIG. 1, seen over the whole contact surface 3 and chamber configuration 7, has been changed so that a reduced coating thickness 'b' in comparison to the coating thickness 'a' of the chamber configuration 7 arises, by abrasion of the edge areas 9, 10. Since the chamber configuration 7 is only partially filled, a reservoir remains operational for lubrication oil. In this example the original coating thickness shown in FIG. 1 of 40 µm in the edge areas 9, 10 would be worn away to 10 µm.

FIG. 3 shows the operating state of the piston ring 1, namely after its running-in phase. The edge areas 9, 10 recognized in FIG. 2 are now worn away so that after the optimal shape adaptation of the contact surface 3 at a cylinder wall not further shown then the central PVD covering coat 8 will come into contact with the cylinder wall.

The invention claimed is:

1. Piston ring, having a main body, which exhibits a contact surface provided with at least one chamber configuration, an upper and a lower flank surface along with an inner peripheral surface, whereby the contact surface is provided with at least one PVD coating, in such a way that the same is adapted at the contour of the contact surface, without filling up the chamber completely respective edge areas are provided with a reduced coating thickness, b in comparison with the coating thickness, a of the chamber configuration; and where there are no additional coatings applied to the at least one PVD coating having the partially filled chamber, such that the coated chamber remains only partially filled and also remains recessed below the respective coated edge areas.

2. Piston ring according to claim 1, wherein the PVD coating exhibits the coating thickness, a of 10 to 50 μm at the chamber configuration and the coating thickness, b of 1 to 10 μm at the edge areas.

3. Piston ring according to claim 1, wherein the PVD coating is formed on the basis of CrN, CrON.

4. Piston ring according to claim 1, wherein the PVD coating comprises group IV b to VI b elements in the periodic table based upon nitrides with or without the addition of Al and/or Si and/or C and/or O.

* * * * *